United States Patent [19]
Nagai et al.

[11] Patent Number: 4,735,996
[45] Date of Patent: Apr. 5, 1988

[54] SHAPED ARTICLE OF FLUOROCARBON POLYMER HAVING ADHESIVE SURFACE

[75] Inventors: Itsuo Nagai, Otsu; Kenji Hatada, Shiga; Hiroaki Kobayashi, Otsu, all of Japan

[73] Assignee: Toray Industries, Inc., Otsu, Japan

[21] Appl. No.: 898,851

[22] Filed: Aug. 19, 1986

Related U.S. Application Data

[63] Continuation of Ser. No. 624,578, Jun. 24, 1984, abandoned.

[30] Foreign Application Priority Data

Jun. 30, 1983 [JP] Japan .................................. 58-118473

[51] Int. Cl.$^4$ .................................................. C08F 8/00
[52] U.S. Cl. ........................... 525/326.4; 204/165; 428/422
[58] Field of Search ............... 525/368, 369, 372, 373, 525/326.4, 326.3, 326.2

[56] References Cited

U.S. PATENT DOCUMENTS

| | | | |
|---|---|---|---|
| 3,122,445 | 2/1965 | Osborn | 525/326.4 |
| 3,133,854 | 5/1964 | Simms | 525/326.4 |
| 3,252,954 | 5/1966 | Calfee | 525/326.4 |
| 3,507,844 | 4/1970 | Wood | 525/326.4 |
| 3,560,595 | 2/1971 | Phillips | 525/326.4 |
| 4,536,266 | 8/1985 | Bliefert | 525/356 |

*Primary Examiner*—Christopher Henderson
*Attorney, Agent, or Firm*—Austin R. Miller

[57] ABSTRACT

The present invention provides with a shaped article of a fluorocarbon polymer having a fluorine/carbon ratio of 1.9 to 2.0, in which at least a part of surface has a fluorine/carbon ratio of 0.8 to 1.8. The shaped article has an improved adhesive properties, especially heat-sealing adhesive property and can be manufactured by a low-temperature plasma treatment of the surface of the fluorocarbon polymer shaped article.

As compared with conventional surface-reformed ones, the fluorocarbon polymer shaped article of this invention has an improved adhesive property, especially for heat-sealing, which is not deteriorated during their storage either at a high temperature, at a high humidity or on exposure to ultraviolet ray.

10 Claims, 4 Drawing Sheets

SHAPED ARTICLE OF FLUOROCARBON POLYMER HAVING ADHESIVE SURFACE

CROSS-REFERENCE

This is a continuation of Ser. No. 624,578, filed June 26, 1984, now abandoned.

BACKGROUND OF THE INVENTION (1) Field of the Invention

This invention relates to an adhesive fluorocarbon polymer shaped article.

(2) Description of Prior Art

It has been well known that fluorocarbon polymers have superior characteristics such as heat resistance, chemical resistance, transparency, ultraviolet ray deterioration resistance, humidity resistance, electric characteristics and so on as compared with other polymer materials. But it also has been said that they are defective because a shaped article of fluorocarbon polymer has only a inferior adhesive properties. Thus it has been desired to improve the adhesive properties of fluorocarbon polymer shaped articles, especially their heat-sealable adhesive properties. In this connection, the following proposals have been made for reforming the surface of a fluorocarbon polymer shaped article to improve adhesive properties.

(1) E. R. Nelson et al method for treating polytetrafluoroethylene with sodium naphthalene solutions (Ind. Eng. Chem., 50 329, 1958). This method has most commonly been used for improving adhesive properties of polytetrafluoroethylene polymers, but it lowers adhesive strength day by day, and exposure to ultraviolet rays reduces adhesive strength and causes color changes. Furthermore the method is not capable of giving the polytetrafluoroethylene sufficient heat-sealing properties.

(2) T. Moriuchi et al (proceedings of the 7th Int'l Vac. Cong. & 3rd Int'l Conf. Solid Surfaces; 1977) in this method for improving the adhesive property of polytetrafluoroethylene, characteristic cone-like structures are developed on the polymer surface by sputter etching, and thereby polytetrafluoroethylene is made adhesive with epoxy adhesives. Polytetrafluoroethylene treated by this method, however, is not suitable for acrylic adhesives. Furthermore the method is defective in that the characteristic cone-like structure is readily deteriorated by friction to cause the loss of adhesive properties.

(3) In J. Richard Hall et al method, J. Appl. Polym. Sci., 16, 1465, 1972). various kinds of polymers including fluorinated ethylene-propylene copolymers are treated with a low-temperature plasma of He or $O_2$ gas at a discharge output of 50 W for one to 50 minutes, and the adhesive strength of the treated polymer with aluminum plate by an epoxy adhesive is examined. According to the result of their experiment, fluorinated ethylene-propylene copolymers are not considerably improved in adhesive properties through low-temperature plasma treatment, though a variety of other polymers are contrary. In experiments of the present inventors the same results have been obtained and it was confirmed that the products have no heat sealing properties.

(4) U.S. Pat. No. 3,627,624 discloses a method for improving fluorinated ethylene-propylene copolymers in adhesive properties to polyimide film through treatment with corona discharge in an atmosphere containing acetone vapor at atmospheric pressure. The products of this method, however, are faulty in that their adhesive property is lowered at high temperature, under high humidity or on exposure to ultraviolet rays. Furthermore the corona discharge treatment tends to cause problems in uniformity of quality.

The methods (1), (3) and (4) are intended to improve fluorocarbon polymers in adhesive properties by changing the chemical composition at their surfaces, and method (2) by changing their configuration at the surface. All of them, however, have such defects and disadvantages as stated above.

SUMMARY OF THE INVENTION

An object of the present invention is to provide a fluorocarbon polymer shaped article having an improved adhesive surface which does not deteriorate in adhesive strength even at high temperature or in high humidity, as well as under exposure to ultraviolet rays, and which most preferably is heat-sealable.

The fluorocarbon polymer shaped article of this invention is characterized in that at least a part of its surface has a reduced fluorine/carbon ratio (F/C) of 0.8 to 1.8 as compared with the original ratio of 1.9 to 2.0. The fluorine/carbon ratio is herein defined as the ratio of the number of fluorine atoms to the number of carbon atoms in the specified portion of the fluorocarbon polymer.

DESCRIPTION OF THE PREFERRED EMBODIMENT

The present inventors have improved fluorocarbon polymer shaped article which is superior in adhesive properties, which is not deteriorated in adhesive strength at high temperature and high humidity or on exposure to ultraviolet rays, and permits heat-sealing adhesion. As the result it has been found out that the atomic composition of the surface layer is deeply related with the adhesive property, and so the invention was worked out.

The fluorocarbon polymer shaped articles in accordance with the invention are characterized in that at least a part of their surface is reformed so as to have a surface layer in which the fluorine/carbon ratio (F/C) is reduced to 0.8 to 1.8 as compared with its original value of 1.9 to 2.0.

The base fluorocarbon polymer in accordance with the present invention is not restricted in any way except that it has a F/C value of 1.9 to 2.0. Such polymers are represented by polytetrafluoroethylene (called PTFE hereinafter), tetrafluoroethylene-hexafluoropropylene copolymers (called FEP hereinafter), tetrafluoroethylene-perfuloroalkoxyethylene copolymers (called PFA hereinafter), and tetrafluoroethylene-hexafluoropropylene-perfluoroalkoxyethylene terpolymers (called EPE hereinafter). Particularly copolymers of tetrafluoroethylene and other fluorocarbon monomers such as FEP, PEA and EPE are preferable because they are readily shapable to the form of film and sheet by melt-moldiing and are superior in transparency. These fluorocarbon copolymers are described, in detail, in U.S. Pat. Nos. 2,833,686, 2,946,763, 3,051,683, 3,159,609, 3,180,895, 3,132,123 and 4,029,868.

The quantity of the fluorine atoms in the reformed surface layer is very significant for providing the fluorocarbon polymer with adhesive properties. They are required to have F/C values of 0.8 to 1.8. If the F/C value is more than 1.8, there is substantially no improvement in adhesive properties and the reformed surface layer has almost the same adhesive property as the base polymer. If the F/C value is below 0.8, the products show improved adhesive properties but the adhesive strength decreases with the decline of F/C value. A fluorocarbon polymer shaped article having a reformed surface layer with an F/C within the above range is strongly adhesive to an epoxy adhesive, an acrylic adhesive or other types of adhesives. To obtain a heat sealable adhesive surface it is required that the F/C value of the reformed layer is 0.8 to 1.8 and at the same time the relationship between the oxygen/carbon ratio (called O/C hereinafter) and the F/C value is within the range as represented by the formula $(O/C) \leq 0.2 - 0.09 \times (F/C)$. The oxygen/carbon ratio is herein defined as the ratio of the number of oxygen atoms to the number of carbon atoms in the fluorocarbon polymer. The product has a low heat-sealing adhesion strength if the F/C and O/C values are outside the above range. Herein, heat sealing is effected at a temperature more than 10° C. lower than the melting point of the fluorocarbon polymer. If the F/C and O/C values are within the above ranges the shaped article of the fluorocarbon polymer is heat-sealable. For example, when an FEP having a melting point of 260° to 280° C. is reformed so as to have both an F/C and an O/C within the above ranges, a film of the polymer can be heat-sealed at a temperatures of 180° to 240° C. without any thermal deformation. Of course, heat-sealing is possible even at a higher temperature.

A fluorocarbon polymer shaped article having a reformed surface layer with an F/C ratio of 1.0 to 1.8 and an O/C value $\leq 0.2 - 0.09 \times (F/C)$ is preferable because the decrease in adhesive strength of such a polymer on exposure to ultraviolet ray is very small.

A fluorocarbon polymer shaped article having a reformed layer with an F/C ratio of 1.3 to 1.8 and an O/C ratio within $O/C \leq 0.2 - 0.09 \times (F/C)$ permit a secure heat-sealing adhesion to other polymer resins, particularly to aromatic polyimides.

The reformed surface layer with the above atomic composition of the fluorocarbon polymer shaped article of the present invention may have a thickness of 100 Å to 1 μm, preferably of 1,000 to 5,000 Å in order to give the polymer excellent adhesive properties while keeping other physical properties of the original polymer unaffected. It is not necessarily required that the whole layer have the above atomic composition. The F/C and O/C ratios of the surface layer are defined in this invention by the observation using X-ray photoelectron spectroscopy (ESCA).

The reformed surface layer preferably has a smooth surface. A rough or uneven surface causes surface wear, and thereby tends to change its atomic composition. It also causes bubbles to remain in the surface recesses on the adhering process, and decreases adhesive strength. Thus the reformed surface layer preferably has an average roughness (Ra) (according to JIS B 0601) of less than 0.02 μm, more preferably less than 0.01 μm. Because of the reason mentioned above, the surface preferably has not more than 10 recesses larger than 0.1 μm$^2$ per 100 μm$^2$, more preferably not more than 10 recesses larger than 0.07 μm$^2$, furthermore preferably not more than 10 recesses larger than 0.03 μm$^2$. The size and density of the recesses can be measured by taking photographes with a scanning electron microscope at a magnification of 15,000× and counting with an image analyzing computer (Cambridge Instruments Co., Ltd. "QUANTIMET" 720).

Of course, the reformed surface layer can be formed all over the surface of the shaped article or only over such part of the same that requires adhesive properties.

On forming the reformed surface layer in accordance with the invention, surface treatment of the base fluorocarbon polymer material is preferably employed because only a very thin layer of the surface of the polymer can be reformed and therefore it can be ensured that only adhesive property is improved without affecting the superior characteristics of the fluorocarbon polymer.

A low-temperature plasma treatment of the surface is most preferable for this purpose. By this method the atomic composition of the surface can be changed considerably at only very thin layer of the surface, and thereby the reformed surface layer can be formed without substantially changing the characteristics of the fluorocarbon polymer shaped article as a whole. The adhesive property thus given to the fluorocarbon polymer shaped article does not decrease the adhesive strength either at a high temperature, in high humidity or on exposure to ultraviolet rays.

Low-temperature plasma surface treatment is carried out by exposing a shaped article to plasma generated through the so-called glow discharge process, applying high voltage in a low pressure gas atmosphere. Generation of low-temperature plasma is described, in detail, in "the Techniques and Applications of Plasma Chemistry" (edited by John R. Hallahan and Alexis T. Bell, John Wiley & Sons, 1974).

The fluorine atoms in the fluorocarbon polymer are readily extracted through low-temperature plasma treatment, so the F/C ratio in the surface layer is considerably decreased by the treatment. In the ordinary low-temperature plasma treatment, a power density of more than 50 W.sec/cm$^2$ is used, but this level of the power density is too much for the purpose of this invention, because the F/C ratio is then lowered to less than 0.8 and no sufficient improvement in adhesive property is observed.

For manufacturing the fluorocarbon polymer shaped article in accordance with the present invention, the treatment is preferably carried out at a power density of 0.03 to 10 W.sec/cm$^2$. If the power density is less than 0.03 W.sec/cm$^2$, enough fluorine atoms cannot be extracted to reduce the F/C value to 1.8. If the power density is more than 10 W.sec/cm$^2$, an excessive number of fluorine atoms are extracted to reduce the F/C value to below 0.8. The preferred power strength is 0.1 to 5 W.sec/cm$^2$.

As stated above, J. Richard Hall et al attempted to improve the adhesive properties of polymer materials by low-temperature plasma treatment. It can be said, however, that they employed too high a power density and therefore no satisfactory improvement of the adhesive property could be obtained.

The selection of the gas for starting and continuing low-temperature plasma constitutes another key factor in the low-temperature plasma treatment. The gas can be selected from Ar, $H_2$, CO, $CO_2$, $NH_3$, $SO_2$, HCl, freon gases such as $CF_4$, $H_2S$ and mixtures of these gases with each other and with other gases. The oxygen content of the gas, however, has to be less than 10 mol %. Gases either with a CO content of more than 10 mole % or with an $NH_3$ content of more than 0.1 mole % are preferable for reforming the surface by plasma treatment under a wide range of treating conditions.

A number of proposals have been offered as to low-temperature plasma generating apparatus. However, this invention is by no means restricted to any specific apparatus, power source or frequency of the power supply.

The shaped article this invention is not limited in shape, and can be any one of sheet, film, block, bar, tube and others, but thereamong a thin film- or sheet-like shaped article having a thickness of more than 1 μm, preferably more than 10 μm is most preferable in this invention.

The fluorocarbon polymer film in accordance with the invention ensures a secure heat-sealing adhesion of the same to aromatic polyimide resins and enables one to prepare a heat-resistant laminate having a high electric insulating performance. Preferable aromatic polyimide resins usable for this purpose are condensation polymerization products of aromatic tetracarboxylic acid and aromatic diamine. Such a polymer is described, in detail, in U.S. Pat. Nos. 3,179,614 and 3,179,634. A particularly preferable polyimide is a condensation polymerization product of pyromellitic dianhydride and 4,4'-diaminodiphenylether or 3,4,3',4'-diphenyltetracarboxylic dianhydride and 4,4'-diaminodiphenylether.

Fluorocarbon polymer film and aromatic polyimide film are laminated by heat-sealing at or below the melting point of the former without the melt-deformation of the same. Since enough adhesive strength cannot be obtained at the temperature, the laminate has to be heated again to a higher temperature in order to increase the adhesive strength after a wire is wrapped therewith. The laminates, however, are likely to separate from each other on wrapping a wire therewith.

The fluorocarbon polymer film having a reformed surface layer in accordance with the present invention can achieve a sufficient adhesive strength of more than 400 g/cm when it is heat-sealed with an aromatic polyimide film at the melting point of fluorocarbon polymer. Furthermore, when the fluorocarbon polymer film is laminated with an aromatic polyimide film treated with a low-temperature plasma by heat-sealing, an adhesive strength of more than 600 g/cm can be obtained.

The fluorocarbon polymer shaped article in accordance with the present invention which has a reformed surface layer with a fluorine/carbon ratio of 0.8 to 1.8 is heat-sealable either to another such layer or with other polymers, metals or glasses. Various kinds of thermosetting or thermoplastic adhesives are also usable for the shaped article. It is also a remarkable characteristic of the present invention that the adhesive property does not decrease at high temperature in high humidity. Furthermore the excellent physical properties of the fluorocarbon polymer such as heat resistance, chemical stability, anti-ultraviolet and humidity resistance are not badly affected. They are free from the yellowing that always occurs when a fluorocarbon polymer is treated by a conventional method to improve its adhesive properties; they keep superior transparency. They are therefore preferable for a variety of uses including adhesive, magnetron coverlay, laminate, glass cover and electric insulation films. Furthermore a laminate with an aromatic polyimide film in accordance with the present invention can preferably be used as an insulating cover for electric parts usable at a high temperature or a coverlay film for electronic circuits because it can be adhered by heat to metals, glasses or other polymer resins.

The following are the descriptions of methods for measuring physical properties, referred to in the specification.

(1) Analysis of the atomic composition at the surface of the fluorocarbon polymer The peak area ratio measured between $C_{1S}$, $F_{1S}$ and $O_{1S}$ using an X-ray photoelectron spectroscopic system (Model ES-200 manufactured by Kokusai Electric Co., Ltd.) was corrected in connection with detection sensitivity, and atom composition ratio F/C and O/C were calculated.

The following measuring conditions were used:
X-ray for excitation: Al, $K_{\alpha 1,2}$ rays (1486.6 eV)
X-ray output: 10 kV, 20 mA
Temperature: 20° C.
Pressure: $3 \times 10^{-8}$ Torr (2) Adhesive gluing of films to each other Araldite (manufactured by Ciba Geigy A.G., Switzerland, and sold by Showa Highpolymer Co., Ltd.) was applied to one side of films and their press adhesion is made and cured at 100° C. for 30 minutes.

(3) Thermal adhesion of films

Fluorocarbon polymer films were adhered to each other using a heat sealer with hot plate temperature set to 210° to 240° C., press pressure to 1.5 kg/cm$^2$, and heat-sealing time to 10 to 30 seconds. Fluorocarbon polymer film and aromatic polyimide film were adhered to each other using a roll laminator with roll temperature set to 275° C., roll pressure 20 kg/cm and laminate speed to 0.5 m/min.

(4) Measuring adhesive strengths

T-peeling was carried out using an universal tensile tester (TENSILON manufactured by TOYO BALDWIN CO., LTD.) at cross-head speed rate of 200 mm/min.

(5) Ultraviolet ray deterioration resistance

The films were thermally adhered to each other under the above conditions and irradiated with ultraviolet rays at an atmospheric temperature of 40° C. for a fixed time, and their adhesive strength was measured using the above method.

(6) Adhesive strength deterioration test at high temperatures and high humidities The films were thermally adhered to each other under the above conditions, left at an atmospheric temperature of 65° C. and 100% RH for a fixed time, and their adhesive strength was measured using the above method.

FEP film pieces with a thickness of 75 μm and a width of 13 cm were put into an inner electrode type plasma treating system and after initial pressure was reduced to 0.03 Torr treated at a rate of 1 m/min with pressure kept at 0.40 Torr by introducing NH₃ gas, with 110 kHz high-frequency voltage applied and with high-frequency power varied.

Figure 1:
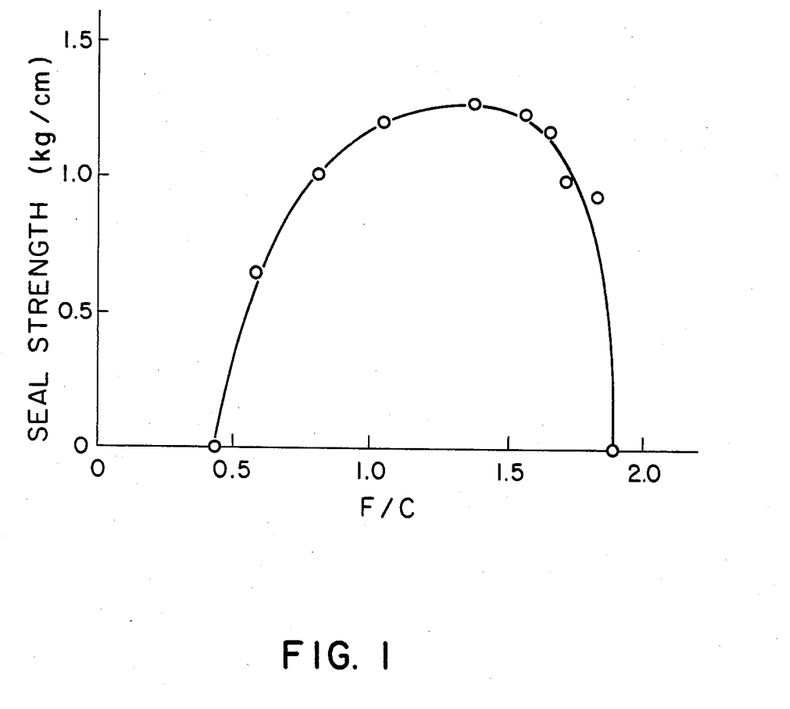
FIG. 1 is a graph which shows the relationship between epoxy adhesive seal strength and the F/C value of the FEP film.

The treated film pieces were subjected to epoxy adhesion by the above method and their adhesive strength was measured. The results of this measuring are shown in Table 1, and FIG. 1 is the corresponding graph. As shown in FIG. 1, the F/C value is required to be 0.8 to 1.8 for obtaining adhesive strengths more than 1 kg/cm, generally regarded as sufficient.

Sections of the treated films were dyed with osmic acid and the thickness of the reformed layer was determined using an electron microscope, and was 300 to 3,000 Å. The formed layers all had an average surface roughnesses (Ra) of 0.01 μm and less than 10 recesses per 100 μm².

at 0.40 Torr by introducing various gases, and with 110 kHz high-frequency voltage applied. The categories of the gases and high-frequency power are shown in Table 2.

The treated film pieces were adhered to each other using a heat sealer and their adhesive strengths were examined. In heat-sealing, the hot plate temperature was set to 210° C., the pressure to 1.5 kg/cm² and the press time to 10 seconds.

Figure 2:
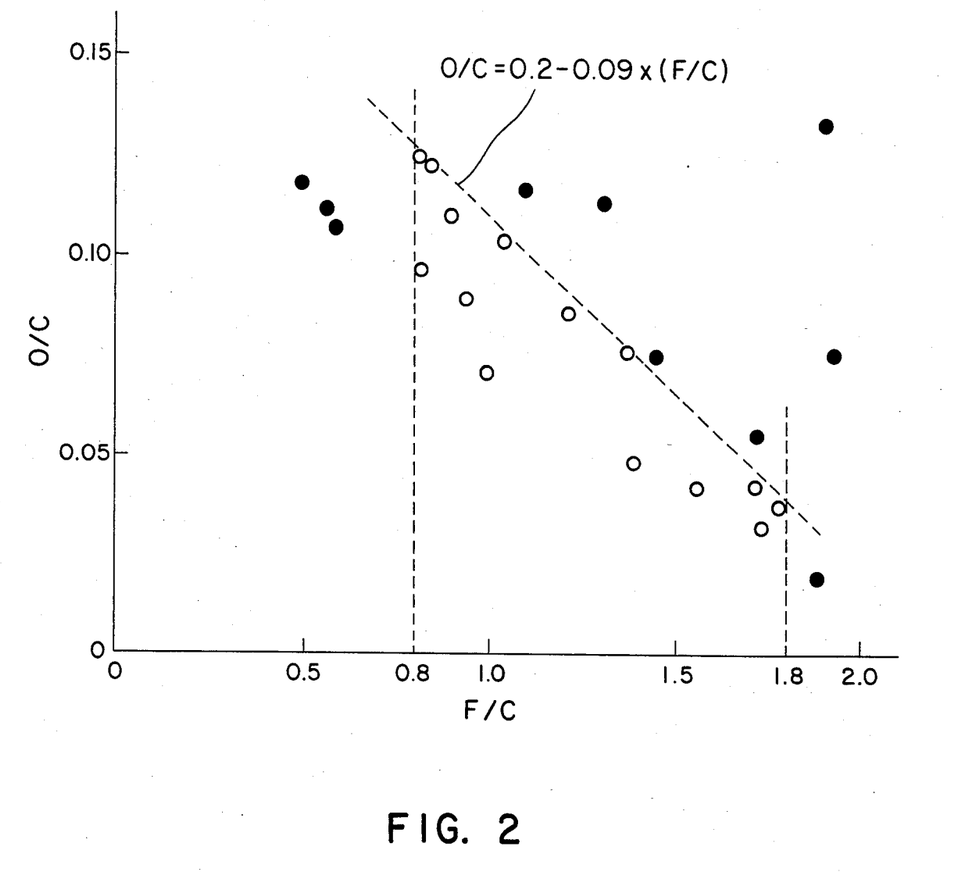
FIG. 2 is a graph obtained by plotting the relationship between the F/C and O/C oxygen-to-carbon values of fluorocarbon polymers. Therein white circles indicate that the heat sealing of 50 μm FEP film has an adhesive strength of more than about 0.8 kg/cm that corresponds to the yield strength of the film. Black circles indicate films having adhesive strengths lower than about 0.8 kg/cm.

Table 2 shows the relationship among the treating conditions, F/C, O/C and {0.2−0.09×(F/C)} and adhesive strengths of the embodiments. FIG. 2 was obtained by plotting the relationship between the F/C and O/C. In the latter the white circles indicate the samples that show an adhesive strength more than 0.8 kg/cm, which is the yield strength of FEP film pieces with a thickness of 50 μm. Black circles indicate the samples that show an adhesive strength of less than 0.8 kg/cm.

Table 2 and FIG. 2 clearly indicate that the FEP film pieces having a reformed layer with F/C values of 0.8 to 1.8 and O/C≦0.2−0.09×(F/C) show a very high adhesive strength.

TABLE 2

| Sample No. | Plasma gas | High-frequency power (W) | F/C | O/C | 0.2−0.09 × (F/C) | Adhesive strength (kg/cm) |
| --- | --- | --- | --- | --- | --- | --- |
| 1 | NH₃ | 2 | 1.88 | 0.019 | 0.031 | 0.05 |
| 2 | NH₃ | 3 | 1.73 | 0.032 | 0.045 | >0.8 |
| 3 | NH₃ | 4 | 1.56 | 0.041 | 0.060 | >0.8 |
| 4 | NH₃ | 7 | 1.39 | 0.047 | 0.076 | >0.8 |
| 5 | NH₃ | 10 | 1.04 | 0.070 | 0.106 | >0.8 |
| 6 | NH₃ | 15 | 0.94 | 0.089 | 0.115 | >0.8 |
| 7 | NH₃ | 20 | 0.82 | 0.096 | 0.126 | >0.8 |
| 8 | NH₃ | 40 | 0.59 | 0.107 | 0.147 | 0.65 |
| 9 | NH₃ | 60 | 0.57 | 0.112 | 0.149 | 0.02 |
| 10 | NH₃ | 80 | 0.50 | 0.103 | 0.155 | 0.02 |
| 11 | NH₃—CO(Mol ratio 1:100) | 4 | 1.72 | 0.041 | 0.045 | >0.8 |
| 12 | NH₃—CO(1:100) | 10 | 1.04 | 0.103 | 0.106 | >0.8 |
| 13 | NH₃—CO(0.1:100) | 15 | 0.82 | 0.123 | 0.126 | >0.8 |
| 14 | NH₃—O₂(100:12) | 5 | 1.72 | 0.055 | 0.045 | 0.25 |
| 15 | NH₃—O₂(100:12) | 15 | 1.30 | 0.112 | 0.083 | 0.03 |
| 16 | NH₃—N₂(1:100) | 100 | 1.21 | 0.085 | 0.091 | >0.8 |
| 17 | NH₃—N₂(1:100) | 200 | 0.85 | 0.123 | 0.124 | 0.79 |
| 18 | CO | 7 | 1.37 | 0.075 | 0.077 | >0.8 |
| 19 | CO | 10 | 0.90 | 0.110 | 0.119 | >0.8 |
| 20 | CO—N₂(100:100) | 4 | 1.78 | 0.037 | 0.040 | >0.8 |
| 21 | N₂ | 15 | 1.45 | 0.074 | 0.070 | 0.03 |
| 22 | N₂ | 20 | 1.10 | 0.116 | 0.101 | 0.02 |
| 23 | O₂ | 90 | 1.90 | 0.132 | 0.029 | 0 |
| 24 | N₂O | 15 | 1.92 | 0.072 | 0.027 | 0.04 |

TABLE 1

| Sample strength No. | High-frequency power (W) | F/C | Adhesive (kg/cm) |
| --- | --- | --- | --- |
| 1 | 2 | 1.88 | 0.05 |
| 2 | 2.5 | 1.83 | 0.95 |
| 3 | 3 | 1.72 | 1.02 |
| 4 | 3.5 | 1.66 | 1.17 |
| 5 | 4 | 1.56 | 1.24 |
| 6 | 7 | 1.38 | 1.28 |
| 7 | 10 | 1.05 | 1.20 |
| 8 | 20 | 0.82 | 1.01 |
| 9 | 40 | 0.59 | 0.65 |
| 10 | 90 | 0.44 | 0.02 |

EXAMPLE 2

FEP film pieces with a thickness of 50 μm and a width of 13 cm were put into an inner electrode plasma treating system and after initial pressure was reduced to 0.03 Torr treated at a rate of 1 m/min with pressure kept

EXAMPLE 3

75 μm-thick FEP film pieces were subjected to the low-temperature plasma treatment in the same manner as example 1 and were adhered to each other using a heat sealer. Heat-sealing conditions were set to 240° C. and 30 seconds. Untreated FEP film pieces cannot be adhered at 240° C. and adhered at 260° C. The strength of the adhered film pieces were measured using the above method. The results obtained therein are shown in Table 3.

The adhered film pieces were put on a paint coating fademeter (FM-1 manufactured by Suga Test Instruments Co., Ltd.) and kept irradiated with ultraviolet rays for 20 hours and their adhesive strength was measured using the same method. The results obtained therein are shown in Table 3.

Figure 3:
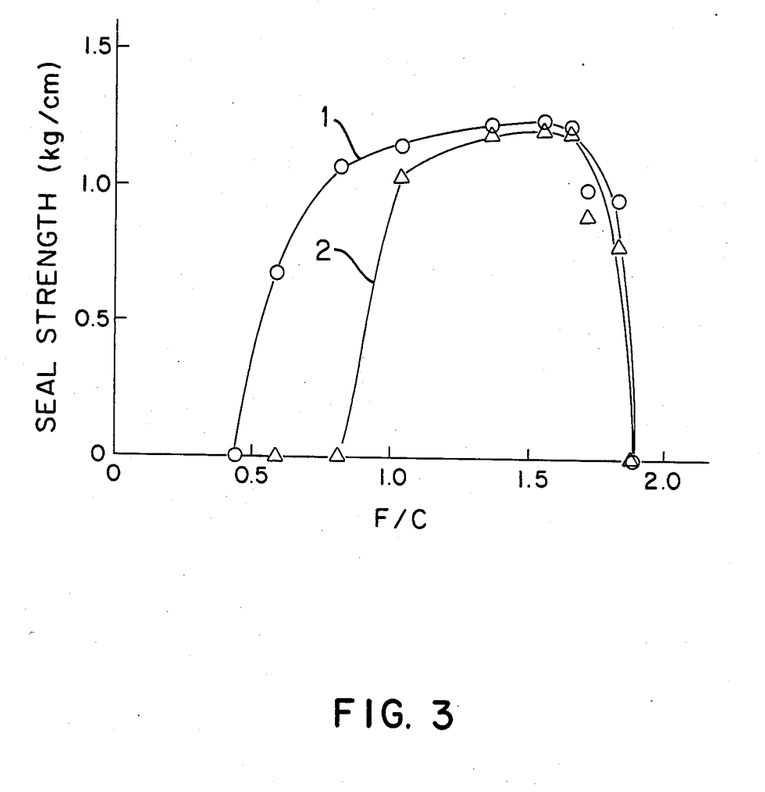
FIG. 3 is a graph which shows the relationship between the heat-sealing adhesion strength and the F/C value of FEP film. Therein curves 1 and 2 represent values measured immediately after heat-sealing and after ultraviolet ray radiation for 20 hours, respectively.

FIG. 3 shows their graph (curves 1 and 2 indicate the adhesive strengths immediately after thermal adhesion and after ultraviolet ray radiation respectively as shown in Table 3). As is learned therefrom, the F/C value should be 0.8 to 1.8, preferably 1.0 to 1.8, for obtaining more than 1 kg/cm adhesive strengths.

Further the film pieces left at high temperatures and high humidities for 200 hours after being adhered were subjected to measurement of adhesive strength. The results obtained therein are shown in Table 3. They showed little decrease in adhesive strength, provided the value F/C is 0.8 to 1.8. On the other hand, they considerably decrease in adhesive strength if the F/C value is outside the above range, particularly less than 0.8.

TABLE 3

| Sample No. | High-frequency power (W) | F/C | O/C | Adhesive strength immediately after heat sealing (kg/cm) | Adhesive strength after ultraviolet ray radiation (kg/cm) | Adhesive strength after storage at high temp. and high humid. (kg/cm) |
| --- | --- | --- | --- | --- | --- | --- |
| 1 | 2 | 1.88 | 0.020 | 0.06 | 0.05 | 0.04 |
| 2 | 2.5 | 1.83 | 0.025 | 0.97 | 0.80 | 0.79 |
| 3 | 3 | 1.72 | 0.030 | 1.04 | 0.90 | 1.00 |
| 4 | 3.5 | 1.66 | 0.036 | 1.24 | 1.23 | 1.13 |
| 5 | 4 | 1.56 | 0.041 | 1.25 | 1.24 | 1.12 |
| 6 | 7 | 1.38 | 0.049 | 1.24 | 1.20 | 1.15 |
| 7 | 10 | 1.05 | 0.070 | 1.15 | 1.05 | 1.10 |
| 8 | 20 | 0.82 | 0.095 | 1.08 | 0.20 | 1.03 |
| 9 | 40 | 0.59 | 0.110 | 0.68 | 0.13 | 0.02 |
| 10 | 90 | 0.44 | 0.124 | 0.02 | 0.01 | 0.01 |

EXAMPLE 4

The FEP film pieces with a thickness of 50 μm and a width of 13 cm were put into an inner electrode type plasma treating system and after the pressure was reduced to 0.03 Torr they were treated at a rate of 2 m/min with the pressure kept at 0.40 Torr by introducing NH3 gas and with 110 kHz high-frequency voltage applied. The high-frequency powers supplied therein are shown in Table 4.

The film pieces and the aromatic polyimide film pieces with a thickness of 50 μm (trade name "KAPTON" manufactured by E. I. du Pont de Nemours and Company) were heat-laminated using the above method.

The adhesive strength of the laminate of the FEP and aromatic polyimide films were measured using the above method. The results obtained therein are shown in Table 4 and FIG. 4.

TABLE 4

| Sample No. | High-frequency power (W) | F/C | O/C | 0.2–0.09 x (F/C) | Adhesive strength (kg/cm) |
| --- | --- | --- | --- | --- | --- |
| 1 | 3 | 1.97 | 0.010 | 0.020 | 0.19 |
| 2 | 6 | 1.74 | 0.021 | 0.040 | 0.49 |
| 3 | 8 | 1.55 | 0.033 | 0.060 | 0.55 |
| 4 | 14 | 1.39 | 0.042 | 0.075 | 0.54 |
| 5 | 16 | 1.32 | 0.043 | 0.081 | 0.42 |
| 6 | 18 | 1.24 | 0.044 | 0.088 | 0.23 |

Figure 4:
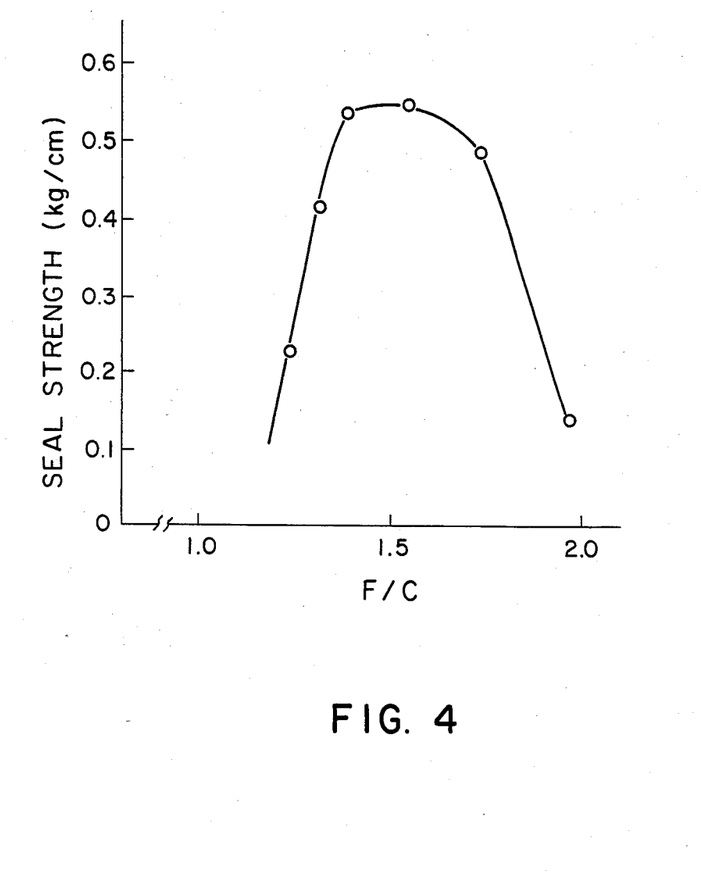
FIG. 4 is a graph which shows the relationship between the heat sealing adhesion strength and the F/C values of FEP and polyimide films.

They both indicate that F/C and O/C should preferably be 1.3 to 1.8 and less than {0.2−0.09×(F/C)} respectively for obtaining more than 400 g/cm adhesive strengths.

EXAMPLE 5

Film pieces of the condensation polymerization products (aromatic polyimide 1) of pyromellitic dianhydride and 4,4′-diaminodiphenylether and those (aromatic polyimide 2) of 3,4,3′,4′-diphenyltetracarboxylic dianhydride and 4,4′-diaminodiphenylether were put into an inner electrode plasma treating system and treated with Ar gas at a rate of 1 m/min with 200 W high-frequency power supplied.

The treated film pieces and the FEP film pieces of No. 5 sample of example 4 were heat-laminated using the above method.

The adhesive strength of the FEP and aromatic polyimide film laminate was measured using the above method. Its samples all increased in adhesive strength as shown in Table 5.

TABLE 5

| Sample No. | | Adhesive strength (kg/cm) |
| --- | --- | --- |
| 1 | Aromatic polyimide film 1 | 0.65 |
| 2 | Aromatic polyimide film 2 | 0.62 |

EXAMPLE 6

PFA and EPE film pieces with a thickness of 75 μm and PTFE sheets with a thickness of 200 μm were subjected to low-temperature plasma treatment under the same conditions as example 1 with 7 W high-frequency power supplied.

The adhesive strength of the treated films and sheets was checked using the method in example 1. As the result, they showed considerably improved adhesive strengths as shown in Table 6.

TABLE 6

| Sample No. | Cat. of fluorocarbon film (Heat seal temperature) | F/C | Adhesive strength (kg/cm) |
| --- | --- | --- | --- |
| 1 | PFA (250° C.) | 1.51 | 1.42 |
| 2 | EPE (240° C.) | 1.42 | 1.36 |
| 3 | PTFE (340° C.) | 1.07 | 1.31 |

What we claim is:

1. A shaped article of a fluorocarbon polymer having essentially no hydrogen attached to carbon and having a shaped solid body portion having a fluorine/carbon ratio (F/C) of from 1.9 to 2.0 characterized in that at least a part of a surface portion of said article layer is an adhesive surface portion that has a composition different than that of the body portion and has a surface in which the fluorine/carbon ratio is from 0.8 to 1.8, and in which the oxygen/carbon ratio is equal to or less than 0.2–0.09 times (F/C).

2. A shaped article of claim 1 characterized in that the surface layer has a fluorine/carbon ratio of from 1.0 to 1.8.

3. A shaped article of claim 1 characterized in that the surface layer has a fluorine/carbon ratio of from 1.3 to 1.8.

4. A shaped article of claim 1 further characterized in that the surface layer has a thickness of from 100 to 5,000 Å.

5. A shaped article of claim 1 further characterized in that the surface layer has an average surface roughness of less than 0.01 μm.

6. A shaped article of claim 1 further characterized in that said surface layer has less than ten recesses per 100 μm² of its surface, said recess having an area of more than 0.03 μm².

7. A shaped article of claim 1 wherein the fluorocarbon polymer a tetrafluoroethylene-hexafluoropropylene copolymer.

8. A shaped article of claim 1 wherein the fluorocarbon polymer is a tetrafluoroethylene-perfluoroalkoxyethylene copolymer.

9. A shaped article of claim 1 wherein the fluorocarbon polymer is a tetrafluoroethylene-hexafluoropropylene-perfluoroalkoxyethylene terpolymer.

10. A shaped article of claim 1 wherein the fluorocarbon polymer is a tetrafluoroethylene polymer.

* * * * *